United States Patent
Auld et al.

(10) Patent No.: US 9,156,975 B2
(45) Date of Patent: Oct. 13, 2015

(54) BINDER THICKENED WITH XANTHAN GUM

(71) Applicant: Rohm and Haas Company, Philadelphia, PA (US)

(72) Inventors: Kathleen Auld, Collegeville, PA (US); Ward Thomas Brown, North Wales, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 14/387,262

(22) PCT Filed: Mar. 20, 2013

(86) PCT No.: PCT/US2013/033042
§ 371 (c)(1),
(2) Date: Sep. 23, 2014

(87) PCT Pub. No.: WO2013/142542
PCT Pub. Date: Sep. 26, 2013

(65) Prior Publication Data
US 2015/0051321 A1    Feb. 19, 2015

Related U.S. Application Data

(60) Provisional application No. 61/614,769, filed on Mar. 23, 2012.

(51) Int. Cl.
| | | |
|---|---|---|
| A61K 8/73 | (2006.01) | |
| C08K 3/22 | (2006.01) | |
| B01J 13/02 | (2006.01) | |
| C08L 33/08 | (2006.01) | |
| C09C 1/36 | (2006.01) | |
| C09D 7/00 | (2006.01) | |
| C09D 7/12 | (2006.01) | |
| C09D 17/00 | (2006.01) | |
| C08L 5/00 | (2006.01) | |

(52) U.S. Cl.
CPC . *C08L 33/08* (2013.01); *C08K 3/22* (2013.01); *C08L 5/00* (2013.01); *C09C 1/3676* (2013.01); *C09D 7/002* (2013.01); *C09D 7/005* (2013.01); *C09D 7/1225* (2013.01); *C09D 17/008* (2013.01); *C01P 2006/22* (2013.01); *C01P 2006/60* (2013.01); *C08K 2003/2241* (2013.01)

(58) Field of Classification Search
CPC ...... C09C 1/3676; C09D 7/002; C09D 7/005; C09D 7/1225; C09D 17/008; C08L 33/08; C08L 5/00; C08K 3/22; C08K 2003/2241; C01P 2006/60; C01P 2006/22
USPC ................. 524/55, 497; 427/213.34
See application file for complete search history.

(56) References Cited

U.S. PATENT DOCUMENTS

| | | | |
|---|---|---|---|
| 4,421,660 A * | 12/1983 | Solc nee Hajna | 252/62.54 |
| 7,629,399 B2 | 12/2009 | Bloom et al. | |
| 2007/0243145 A1 | 10/2007 | Andre et al. | |
| 2010/0298483 A1 * | 11/2010 | Allen et al. | 524/497 |

FOREIGN PATENT DOCUMENTS

| | | |
|---|---|---|
| EP | 0226671 A1 | 7/1987 |
| EP | 549163 A1 | 6/1993 |
| EP | 0549163 A1 * | 6/1993 |
| EP | 2289484 A1 | 3/2011 |
| WO | 2005072078 A2 | 8/2005 |
| WO | 2006037161 A1 | 4/2006 |

* cited by examiner

*Primary Examiner* — William Cheung
(74) *Attorney, Agent, or Firm* — Reid S. Willis

(57) ABSTRACT

The present invention relates to a composition comprising an aqueous dispersion of xanthan gum and opacifying pigment particles such as $TiO_2$ encapsulated with a vinyl ester polymer or a vinyl ester-acrylate copolymer, as well as a method for its preparation. The composition is useful in coatings formulations, especially paint formulations.

10 Claims, No Drawings

BINDER THICKENED WITH XANTHAN GUM

This application is the National Stage of PCT international application serial No. PCT/US2013/033042 filed Mar. 20, 2013, which claims the benefit of U.S. Provisional Application Ser. No. 61/614,769 filed Mar. 23, 2012, the contents of which are all incorporated by reference herein in their entirety.

BACKGROUND OF THE INVENTION

The present invention relates to a dispersion of polymer- or copolymer-encapsulated pigment particles thickened with xanthan gum, wherein the polymer is a vinyl ester polymer or copolymer.

Polymer encapsulated opacifying pigment particles such as those described in US2010/0298483 are useful for improving hiding efficiencies in paint formulations. These formulations further include a thickener that has to be selected to achieve shelf stability as well as acceptable high shear viscosity and good low shear viscosity. Such a combination can prove to be elusive because the selection of a suitable thickener, if one can be found, is highly dependent on the properties of the encapsulating polymer. Accordingly, it would be desirable to find a suitable thickener for a given polymer used to encapsulate pigment particles.

SUMMARY OF THE INVENTION

The present invention addresses a need by providing, in one aspect, a composition comprising an aqueous dispersion of a) opacifying pigment particles encapsulated with a vinyl ester polymer or a vinyl ester-acrylate copolymer; and b) from 0.05 to 0.5 weight percent of a xanthan gum, based on the weight of the composition. The composition of the present invention provides a shelf stable coating composition that has the requisite good low shear viscosity and acceptable high shear viscosity.

In a second aspect, the present invention is a method comprising contacting a) a mixture of a xanthan gum and a polyethylene glycol having a $M_n$ in the range of 200 to 500; with b) an aqueous dispersion of vinyl ester polymer- or copolymer-encapsulated opacifying pigment particles to form a composition, wherein the weight to weight concentration of xanthan gum in the polyethylene glycol is 5 to 20 weight percent based on the weight of the xanthan gum and the polyethylene glycol; and wherein the xanthan gum comprises from 0.05 to 0.5 dry weight percent based on the weight of the composition.

DETAILED DESCRIPTION OF THE INVENTION

The present invention is a composition comprising an aqueous dispersion of a) opacifying pigment particles encapsulated with a vinyl ester polymer or a vinyl ester-acrylate copolymer; and b) from 0.05 to 0.5 weight percent of a xanthan gum, based on the weight of the composition.

The opacifying pigment particles are characterized by having an index of refraction (at 20° C.) of at least 2.0. Particularly preferred pigment particles are $TiO_2$ particles. The pigment particles are encapsulated with a vinyl ester polymer or a vinyl ester-acrylate copolymer. Examples of such polymers and copolymers are those containing structural units of vinyl acetate and combinations of structural units of vinyl acetate and an acrylate such as ethyl acrylate, butyl acrylate, or 2-ethylhexyl acrylate, or combinations thereof. A particularly preferred vinyl ester-acrylate copolymer includes structural units of vinyl acetate and butyl acrylate that is film-forming at room temperature, preferably from 55 to 95 weight percent, more preferably from 60 to 70 weight percent, and most preferably from 63 to 67 weight percent structural units of vinyl acetate; and from 5 to 45 weight percent, more preferably from 30 to 40 weight percent, and most preferably from 33 to 37 weight percent structural units of butyl acrylate, based on the weight of the structural units of vinyl acetate and butyl acrylate.

The term "structural units" is used to refer to the groups formed from the polymerization of the corresponding monomer. A structural unit of vinyl acetate is as illustrated:

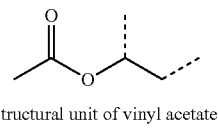

structural unit of vinyl acetate

Other suitable vinyl ester polymers and copolymers include those containing structural units of a vinyl ester of a branched carboxylic acid monomer as illustrated:

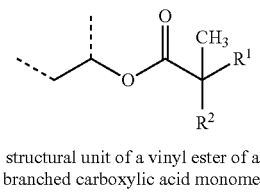

structural unit of a vinyl ester of a
branched carboxylic acid monomer where $R^1$ and $R^2$ are each independently $C_1$-$C_{10}$-alkyl. Examples of suitable vinyl esters of branched carboxylic acid monomers are the vinyl ester of neodecanoic acid (commercially available as VeoVa 10 monomer) and the vinyl ester of neononanoic acid (commercially available as VeoVa 9 monomer).

The vinyl ester polymer or copolymer, preferably the vinyl acetate-butyl acrylate copolymer, preferably further includes structural units of a polymerizable sulfonic acid or salt thereof, such as 2-acrylamido-2-methylpropane-sulfonic acid (AMPS) or a salt thereof at a level of 0.1 to 1.5 weight percent, more preferably in the range of 0.2 to 0.8 weight percent, based on the weight of the polymer or copolymer. The polymer encapsulated pigment particles further advantageously includes structural units of sodium styrene sulfonate at a concentration of from 0.1 to 1.0 weight percent, based on the weight of the polymer or copolymer.

The weight-to-weight ratio of the encapsulating polymer to the opacifying pigment particle, preferably $TiO_2$, is in the range of from 0.4:1 to 2:1.

Examples of polymer encapsulated $TiO_2$ particles are described in U.S. Pat. No. 4,421,660; U.S. Pat. Pub. 2010/0298483, and EP1802662. A preferred general process for fully encapsulating $TiO_2$ particles in a polymer comprises the steps of a) forming a mixture of i) an aqueous dispersion of $TiO_2$ particles and an amphoteric polymer; ii) an anionic surfactant; and iii) sodium styrene sulfonate; b) adding to the mixture of step (a) a redox initiator system; then c) adding an aqueous dispersion of a vinyl ester monomer, optionally an acrylate monomer, and optionally a sulfur acid monomer or a salt thereof; and d) polymerizing the monomer to form an aqueous dispersion of a polymer that encapsulates the $TiO_2$ particles. An especially preferred combination of monomers includes vinyl acetate, butyl acrylate, and 2-acrylamido-2-methyl propanesulfonic acid (AMPS) or a salt thereof.

The amphoteric polymer, which adsorbs to the surface of the $TiO_2$ particles, is a polymeric dispersant for $TiO_2$ particles that contains amine functionality and acid functionality, preferably a polymer that is prepared from the copolymerization of an ethylenically unsaturated amine functional monomer and an ethylenically unsaturated sulfur-acid functional monomer. Examples of suitable ethylenically unsaturated amine functional monomers include dimethylaminoethyl methacrylate, dimethylaminoethyl acrylate, dimethylaminopropyl methacrylamide, dimethylaminopropyl acrylamide, t-butylaminoethyl methacrylate and t-butylaminoethyl methacrylate, with dimethylaminoethyl methacrylate (DMAEMA) being preferred. Examples of suitable ethylenically unsaturated sulfur-acid functional monomers include sulfoethyl methacrylate, sulfoethyl acrylate, sulfopropyl methacrylate, sulfopropyl acrylate, styrene sulfonic acid, vinyl sulfonic acid, 2-methacrylamido-2-methyl propanesulfonic acid, and 2-acrylamido-2-methyl propanesulfonic acid, and salts thereof, with 2-acrylamido-2-methyl propanesulfonic acid and sulfoethyl methacrylate being preferred.

Suitable anionic surfactants include sodium dodecylbenzene sulfonate (SDS) or dodecyl allyl sulfosuccinate. It is understood that the term "a monomer" is used to refer to one or more monomers; similarly, "an aqueous dispersion" refers to one or more aqueous dispersions; thus, a vinyl ester monomer refers to one or more vinyl ester monomers.

The term "redox initiator system" refers to a combination of a reducing agent, an oxidizing agent, and a metal ion catalyst. Examples of suitable oxidizing agents include persulfates such as ammonium and alkali metal persulfates; hydroperoxides, such as t-butyl hydroperoxide and cumene hydroperoxide; peroxides such as benzoyl peroxide, caprylyl peroxide, and di-t-butyl peroxide; peresters such as t-butyl peracetate, t-butyl perphthalate, and t-butyl perbenzoate; percarbonates; and perphosphates; with t-butyl hydroperoxide being preferred.

Examples of suitable reducing agents include ascorbic acid, isoascorbic acid, malic acid, glycolic acid, oxalic acid, lactic acid, and thioglycolic acid; an alkali metal hydrosulfite such as sodium hydrosulfite; a hyposulfite such as potassium hyposulfite; or a metabisulfite such as potassium metabisulfite; and sodium formaldehyde sulfoxylate.

Suitable accelerators include halide and sulfate salts of cobalt, iron, nickel, and copper, used in small amounts. An example of a preferred redox initiator system is t-butyl hydroperoxide/isoascorbic acid/$Fe^{+2}$. Preferably, the accelerator is added prior to the addition of the oxidizing and reducing agents. It is further preferred that the oxidizing and reducing agents are added over time to maintain a relatively even level of radical flux over the course of the addition of monomers.

The dispersion of $TiO_2$ and the amphoteric polymer are advantageously prepared by slowly adding, with concomitant grinding, the $TiO_2$ to an aqueous dispersion of the amphoteric polymer. The preferred solids content of the $TiO_2$/amphoteric polymer dispersion is in the range of 70 to 85 weight percent based on the weight of $TiO_2$, amphoteric polymer, and water.

The composition of the present invention further includes xanthan gum at a level of 0.05 to 0.5 dry weight percent, preferably from 0.1 to 0.3 dry weight percent, based on the weight of the composition. Examples of commercially available xanthan gums include Kelzan AR xanthan gum and Keltrol CG-SFT xanthan gum. The xanthan gum is advantageously contacted with the aqueous dispersion of the polymer-encapsulated pigment particles as a dilute dispersion (~5 to 20 weight percent) in a polar protic solvent, preferably a high boiling polar protic solvent such ethylene glycol, polyethylene glycol, propylene glycol, and polypropylene glycol. The xanthan gum is preferably added to the aqueous dispersion of the polymer- or copolymer-encapsulated pigment particles as an 8 to 12 weight percent solution in polyethylene glycol having a $M_n$ of from 200 to 500, preferably an $M_n$ of 300.

The composition of the present invention is useful in the preparation of coatings formulations, especially paint formulations, which may include a variety of components such as solvents; fillers; hollow pigments, including pigments having one or more voids; dispersants, such as aminoalcohols and polycarboxylates; surfactants; defoamers; preservatives, such as biocides, mildewcides, fungicides, algaecides, and combinations thereof; flow agents; leveling agents; and neutralizing agents, such as hydroxides, amines, ammonia, and carbonates.

EXAMPLES

The following examples are for illustrative purposes only and are not intended to limit the scope of the invention.

The $TiO_2$/amphoteric polymer slurry used in the preparation of Intermediate 1 was prepared essentially as described in U.S. Pat. Pub. 2010/0298483, in Example 2 (para 0053) and Example 5 (para 0059).

ABBREVIATIONS

| | |
|---|---|
| SDS = Sodium dodecylbenzene sulfonate (23%) | BA = Butyl acrylate |
| SSS = Sodium styrene sulfonate | MAA = Glacial methacrylic acid |
| t-BHP = t-Butyl hydroperoxide | DI water = Deionized water |
| AMPS = 2-acrylamido-2-methylpropane-sulfonic acid | IAA = Isoascorbic acid |
| VA = vinyl acetate | PEG = Polyethylene glycol |

Intermediate 1: Preparation of Vinyl/Acrylic Polymer-Encapsulated $TiO_2$ Particles To a 5000-mL four-necked round bottom flask equipped with paddle stirrer, $N_2$-inlet, reflux condenser, heating mantel, and thermocouple was charged $TiO_2$-amphoteric polymer slurry (1973.0 g, 73% $TiO_2$) along with DI water (50.0 g), a solution of SDS (15.0 g) mixed in DI water (100 g) and a separate solution of SSS (6.0 g in 100 g DI water). The flask was purged with $N_2$, and the temperature adjusted to 25° C., at which time an aqueous solution of 0.1% iron sulfate (40.0 g) was added to the flask. Two minutes later co-feed #1 (6.5 g t-BHP dissolved in 200 g DI water) and co-feed #2 (9.0 g IAA dissolved in 200 g DI water) were fed to the reactor at a rate of 1.5 g/min. Two minutes after the onset of the co-feed solution addition, a monomer emulsion (ME) prepared previously by mixing DI water (250.0 g), SDS (30.0 g), Disponil Fes-77 emulsifier (38.0 g), Emcol K8300 emulsifier (6.0 g), TERGITOL 15-S-40 Emulsifier (A Trademark of The Dow Chemical Company or Its Affiliates, 16.3 g), BA (387.6 g), VA (746.7 g), and AMPS monomer (11.4 g) was fed to the reactor at a rate of 15 g/min. The ME addition produced an exotherm that increased the reactor temperature 69° C. When the ME addition was complete, the co-feed #1 and #2 additions were continued for another 20 min until completion. Then, a second set of co-feeds including co-feed #1 (3.2 g t-BHP dissolved in 50 g DI water) and co-feed #2 (4.5 g IAA dissolved in 90 g DI water) were fed to the reactor over 30 min. The contents of the reactor were then cooled to room temperature and the contents filtered to remove any gel. The filtered dispersion was found to have a solids content of 59.1% with <5 ppm of dry gel removed. The polymer had a $T_g$ of −5° C., as calculated by the Fox equation.

Example 1

Preparation of Mixture of Polymer Encapsulated TiO$_2$ and Xanthan Gum

Kelzan® AR Xanthan Gum (0.41 g) was added with stifling to a vessel containing PEG (M$_n$=300, 3.64 g) to form a dispersion. Stirring was continued for 30 min before the dispersion (4.05 g) was transferred to a stirred vessel containing a portion of Intermediate 1 (270 g). The flask was rinsed with additional PEG (1.06 g) to remove residual xanthan gum, and residuum was transferred to the vessel. Stirring was continued for 15 min, after which time initial Brookfield viscosity was measured; the Brookfield viscosity, syneresis, and settling measurements were taken after 8 and 10 weeks to determine stability, as shown in Table 1.

TABLE 1

|  | Initial Measurements | 8 Week Measurements | 10 week Measurements |
| --- | --- | --- | --- |
| Brookfield (3 rpm S3 cps) | 7080 | 7440 | 7160 |
| Syneresis (mm) | Not measured | 1 | 2 |
| Settling | Not measured | none | v. slight soft pack |

The viscosity was found to be stable with acceptable syneresis and settling.

Comparative Example 1

Preparation of Mixture of Polymer Encapsulated TiO$_2$ and HEC

Natrosol 250 MHR HEC (96 g) was added with stirring to a vessel containing water (3099 g), and ammonium hydroxide (28%, 5 g) was added to dissolve the HEC. The HEC solution (25.6 g.) was transferred to a stirred vessel containing a portion of Intermediate 1 (252.29 g). Stirring was continued for 15 min, after which time initial Brookfield viscosity was measured; the Brookfield viscosity, syneresis, and settling measurements were taken after 5 and 11 weeks to determine stability, as shown in Table 2.

TABLE 2

|  | Initial Measurements | 5 Week Measurements | 11 Week Measurements |
| --- | --- | --- | --- |
| Brookfield (3 rpm S3 cps) | 7560 | 5520 | 5560 |
| Syneresis (mm) | Not measured | 3 | 9 |
| Settling | Not measured | none | slight hard pack |

The viscosity was found to be unstable with unacceptable syneresis. The overall results indicate that xanthan gum promotes sedimentation and syneresis resistance as well Brookfield viscosity stability as compared to the HEC thickener; this result is surprising inasmuch as HEC and xanthan gum are both polysaccharides and would be expected to affect these properties in the same way. Moreover, other thickeners that were evaluated including HASE, HEUR, and ASE thickeners were all found to be deficient in achieving one or more of the desired properties. Thus, the xanthan gum is unique among the thickeners evaluated in promoting the desired stabilities.

The invention claimed is:

1. A composition comprising an aqueous dispersion of a) opacifying pigment particles encapsulated with a vinyl ester polymer or a vinyl ester-acrylate copolymer; and b) from 0.05 to 0.5 weight percent of a xanthan gum, based on the weight of the composition.

2. The composition of claim 1 wherein the encapsulating vinyl ester polymer or a vinyl ester-acrylate copolymer comprises from 0.1 to 1.5 weight percent structural units of a polymerizable sulfonic acid or salt thereof, based on the weight of the polymer or copolymer, and the opacifying pigment particles are TiO$_2$ particles.

3. The composition of claim 2 wherein the polymerizable sulfonic acid or salt thereof is 2-acrylamido-2-methylpropane-sulfonic acid or a salt thereof.

4. The composition of claim 3 wherein the weight-to-weight ratio of the encapsulating vinyl ester polymer or the vinyl ester-acrylate copolymer to TiO$_2$ particles is 0.4:1 to 2:1.

5. The composition of claim 1 wherein the TiO$_2$ particles are encapsulated with a vinyl ester-acrylate copolymer comprising, based on the weight of the copolymer, from 55 to 95 weight percent structural units of vinyl acetate and from 5 to 45 weight percent structural units of butyl acrylate.

6. The composition of claim 1 wherein the TiO$_2$ particles are encapsulated with a vinyl ester-acrylate copolymer comprising, based on the weight of the copolymer, from 60 to 70 weight percent structural units of vinyl acetate; from 30 to 40 weight percent structural units of butyl acrylate; and from 0.2 to 0.8 weight percent 2-acrylamido-2-methylpropane-sulfonic acid or a salt thereof.

7. The composition of claim 1 wherein the vinyl ester polymer or copolymer comprises the following structural units:

$$\cdots\!\!-\!\!\overset{}{\underset{}{C}}\!\!-\!\!O\!\!-\!\!\overset{O}{\underset{}{\overset{\|}{C}}}\!\!-\!\!\overset{CH_3}{\underset{R^2}{\overset{|}{C}}}\!\!-\!\!R^1$$

where $R^1$ and $R^2$ are each independently $C_1$-$C_{10}$-alkyl.

8. A method comprising contacting a) a mixture of a xanthan gum and a polyethylene glycol having a M$_n$ in the range of 200 to 500; with b) an aqueous dispersion of vinyl ester polymer- or copolymer-encapsulated opacifying pigment particles to form a composition, wherein the weight to weight concentration of xanthan gum in the polyethylene glycol is 5 to 20 weight percent based on the weight of the xanthan gum and the polyethylene glycol; and wherein the xanthan gum comprises from 0.05 to 0.5 dry weight percent based on the weight of the composition.

9. The method of claim 8 wherein the weight to weight concentration of xanthan gum in the polyethylene glycol is 8 to 12 weight percent based on the weight of the xanthan gum and the polyethylene glycol; wherein the opacifying pigment particles are TiO$_2$ particles; and wherein the xanthan gum comprises from 0.1 to 0.3 dry weight percent based on the weight of the composition.

10. The method of claim 9 wherein the vinyl ester copolymer comprises, based on the weight of the copolymer, from 60 to 70 weight percent structural units of vinyl acetate; from 30 to 40 weight percent structural units of butyl acrylate; and from 0.2 to 0.8 weight percent 2-acrylamido-2-methylpropane-sulfonic acid or a salt thereof.

\* \* \* \* \*